US012111589B2

(12) United States Patent
Ohashi et al.

(10) Patent No.: US 12,111,589 B2
(45) Date of Patent: Oct. 8, 2024

(54) FIXING DEVICE AND IMAGE FORMING APPARATUS INCLUDING REMOVING MEMBER THAT REMOVES OBJECT ATTACHED TO OUTER PERIPHERAL SURFACE USING ROTATIONAL SPEED DIFFERENCE WITH RESPECT TO FIXING MEMBER

(71) Applicant: FUJIFILM Business Innovation Corp., Tokyo (JP)

(72) Inventors: Takashi Ohashi, Kanagawa (JP); Takashi Matsubara, Kanagawa (JP); Takuma Ishihara, Kanagawa (JP); Yasutaka Naito, Kanagawa (JP); Makoto Hasegawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/955,523

(22) Filed: Sep. 28, 2022

(65) Prior Publication Data

US 2023/0305452 A1 Sep. 28, 2023

(30) Foreign Application Priority Data

Mar. 25, 2022 (JP) ................................ 2022-050387

(51) Int. Cl.
*G03G 15/20* (2006.01)

(52) U.S. Cl.
CPC ..... *G03G 15/2025* (2013.01); *G03G 15/2017* (2013.01)

(58) Field of Classification Search
CPC .................................................. G03G 15/2025
USPC .................................................. 399/327, 329
See application file for complete search history.

(56) References Cited

U.S. PATENT DOCUMENTS

| | | | | | |
|---|---|---|---|---|---|
| 5,666,623 | A * | 9/1997 | Yamada | G03G 15/2025 399/116 |
| 6,137,983 | A * | 10/2000 | Okabayashi | G03G 15/2057 399/329 |
| 8,050,607 | B2 * | 11/2011 | Shinshi | G03G 15/2025 399/329 |
| 11,392,063 | B2 * | 7/2022 | Ohwada | G03G 15/2025 |
| 2002/0044806 | A1 * | 4/2002 | Hayashi | G03G 15/2064 399/327 |
| 2008/0152404 | A1 | 6/2008 | Yoshino et al. | |

(Continued)

FOREIGN PATENT DOCUMENTS

JP 2008158054 7/2008

*Primary Examiner* — Robert B Beatty
(74) *Attorney, Agent, or Firm* — JCIPRNET

(57) ABSTRACT

A fixing device includes a fixing member that has an outer peripheral surface and an inner peripheral surface, is rotatably provided, comes into contact with, of a recording material on which an image is formed, a surface on which the image is formed, and fixes the image to the recording material, a rotating member that is rotatably provided and includes, at an outer peripheral portion, a contact surface coming into contact with the inner peripheral surface of the fixing member, and a removing member that is disposed to be in contact with the outer peripheral surface of the fixing member, is rotatably provided, and removes an attached object attached to the outer peripheral surface using a rotation speed difference with respect to the fixing member.

7 Claims, 8 Drawing Sheets

(56) References Cited

U.S. PATENT DOCUMENTS

| | | | | |
|---|---|---|---|---|
| 2008/0267674 | A1* | 10/2008 | Shimizu | G03G 15/161<br>399/307 |
| 2015/0323892 | A1* | 11/2015 | Sakamaki | G03G 15/2017<br>399/327 |
| 2020/0319577 | A1* | 10/2020 | Yamana | G03G 15/161 |

* cited by examiner

FIXING DEVICE AND IMAGE FORMING APPARATUS INCLUDING REMOVING MEMBER THAT REMOVES OBJECT ATTACHED TO OUTER PERIPHERAL SURFACE USING ROTATIONAL SPEED DIFFERENCE WITH RESPECT TO FIXING MEMBER

CROSS-REFERENCE TO RELATED APPLICATIONS

This application is based on and claims priority under 35 USC 119 from Japanese Patent Application No. 2022-050387 filed Mar. 25, 2022.

BACKGROUND

(i) Technical Field

The present invention relates to a fixing device and an image forming apparatus.

(ii) Related Art

For example, JP2008-158054A discloses a configuration where major portions of a fixing belt module include a fixing belt, a fixing roller that is rotationally driven while stretching the fixing belt, a stretching roller that stretches the fixing belt from an inside, a stretching roller that stretches the fixing belt from an outside, a posture correction roller that corrects a posture of the fixing belt between the fixing roller and the stretching roller, a peeling pad that is disposed at a position close to the fixing roller, which is a downstream region in a nip portion, the region being a region where the fixing belt module and a pressurizing roller are in pressure-contact with each other, and a stretching roller (idler roller) that stretches the fixing belt on a downstream side of the nip portion, and a cleaning web for cleaning a surface of the stretching roller is included.

SUMMARY

Herein, in a configuration where an attached object on a fixing member is transferred to a removing member by bringing the removing member into contact with an outer peripheral surface of the fixing member, it is difficult to remove the attached object that has entered a concave portion of the fixing member having high surface roughness in the outer peripheral surface with the removing member rotating at the same speed, and a residual attached object may transfer again to the next recording medium.

Aspects of non-limiting embodiments of the present disclosure relate to a fixing device and an image forming apparatus that improve a cleaning property of a removing member compared to a case where a fixing member and a removing member are rotated at the same speed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a fixing device including a fixing member that has an outer peripheral surface and an inner peripheral surface, is rotatably provided, comes into contact with, of a recording material on which an image is formed, a surface on which the image is formed, and fixes the image to the recording material, a rotating member that is rotatably provided and includes, at an outer peripheral portion, a contact surface coming into contact with the inner peripheral surface of the fixing member, and a removing member that is disposed to be in contact with the outer peripheral surface of the fixing member, is rotatably provided, and removes an attached object attached to the outer peripheral surface using a rotation speed difference with respect to the fixing member.

BRIEF DESCRIPTION OF THE DRAWINGS

Exemplary embodiment(s) of the present invention will be described in detail based on the following figures, wherein:

FIG. 9A is a block diagram for describing a fifth exemplary embodiment, and FIG. 9B is a block diagram for describing a sixth exemplary embodiment.

DETAILED DESCRIPTION

Hereinafter, exemplary embodiments of the present invention will be described in detail with reference to the accompanying drawings.

Figure 1:
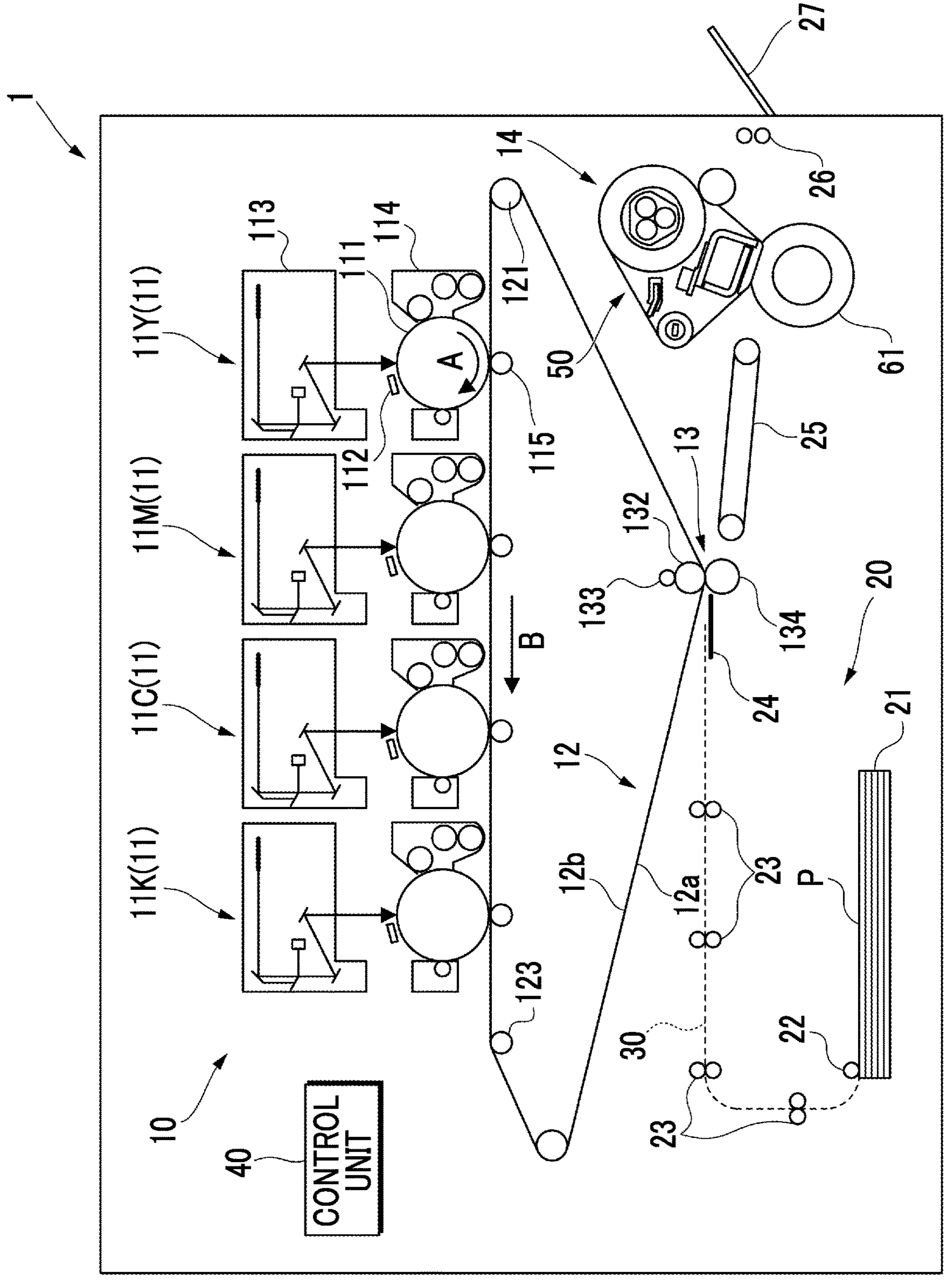
FIG. 1 is a view showing an image forming apparatus according to the present exemplary embodiment.

FIG. 1 is a view showing an image forming apparatus 1 according to the present exemplary embodiment.

The image forming apparatus 1 shown in FIG. 1 is an apparatus forming an image on paper P which is an example of a recording material. The image forming apparatus 1 is provided with an image forming portion 10, a paper transport unit 20, and a control unit 40.

The image forming portion 10 is provided with an image forming unit 11, an intermediate transfer belt 12, a secondary transfer unit 13, and a fixer 14, which is an example of a fixing device.

In the present exemplary embodiment, four image forming units 11Y, 11M, 11C, and 11K corresponding to four colors of toners including yellow (Y), magenta (M), cyan (C), and black (K) respectively are provided as the image forming unit 11.

The image forming units 11Y, 11M, 11C, and 11K are arranged in a moving direction of the intermediate transfer belt 12 and form a toner image through an electrophotographic method.

Each of the image forming units 11Y, 11M, 11C, and 11K has a photoconductor drum 111, a charging unit 112, an exposure unit 113, a developing unit 114, and a primary transfer unit 115.

Each of the image forming units 11Y, 11M, 11C, and 11K forms a toner image of any color of YMCK and transfers the toner image onto the intermediate transfer belt 12. Accordingly, a toner image in which the toner images of respective colors including YMCK overlap each other is formed on the intermediate transfer belt 12.

The photoconductor drum 111 rotates in an arrow A direction at a speed determined in advance. In addition, an electrostatic latent image is formed on a peripheral surface of the photoconductor drum 111.

The charging unit 112 charges the peripheral surface of the photoconductor drum 111 at a potential determined in advance.

The exposure unit 113 irradiates the charged peripheral surface of the photoconductor drum 111 with light and forms an electrostatic latent image on the peripheral surface of the photoconductor drum 111.

The developing unit 114 forms a toner image by attaching a toner to the electrostatic latent image formed on the peripheral surface of the photoconductor drum 111.

The primary transfer unit 115 transfers the toner image formed on the peripheral surface of the photoconductor drum 111 onto the intermediate transfer belt 12.

A voltage having a polarity opposite to a charging polarity of a toner is applied to the primary transfer unit 115. Accordingly, the toner image formed on the peripheral surface of the photoconductor drum 111 is sequentially electrostatically sucked onto the intermediate transfer belt 12, and one overlapping color toner image is formed on the intermediate transfer belt 12.

The intermediate transfer belt 12 is supported by a plurality of roller-shaped members. The intermediate transfer belt 12 is formed in an endless shape and circulates and moves in an arrow B direction. In addition, the intermediate transfer belt 12 includes an outer peripheral surface 12*a* and an inner peripheral surface 12*b*.

The intermediate transfer belt 12 is used in transporting a toner image. In the present exemplary embodiment, a toner image is formed on the outer peripheral surface 12*a* of the intermediate transfer belt 12, and the toner image is transported to the secondary transfer unit 13 with the movement of the intermediate transfer belt 12.

In the present exemplary embodiment, a drive roller 121 that is driven by a motor (not shown) and drives the intermediate transfer belt 12 is provided as the roller-shaped member disposed inside the intermediate transfer belt 12. In addition, an idle roller 123 and a backup roller 132 that support the intermediate transfer belt 12 are provided as the roller-shaped members.

The roller-shaped members are rotatably provided and are pressed against the inner peripheral surface 12*b* of the intermediate transfer belt 12.

The paper transport unit 20 is provided with a paper accommodating unit 21 that accommodates a plurality of sheets of paper P in a stacked state and a pickup roller 22 that takes out and transports the paper P accommodated in the paper accommodating unit 21.

In addition, the paper transport unit 20 is provided with a transport roller 23 that transports the paper P taken out by the pickup roller 22 along a paper transport path 30 and a paper guiding portion 24 that guides the paper P transported by the transport roller 23 to the secondary transfer unit 13.

Further, the paper transport unit 20 is provided with a transport belt 25 that transports the paper P after secondary transfer to the fixer 14 and a paper guiding portion 26 that guides the paper P after fixing to a discharge portion 27.

The secondary transfer unit 13 is provided with a secondary transfer roller 134 that is disposed to be in contact with the outer peripheral surface 12*a* of the intermediate transfer belt 12 and the backup roller 132 that is disposed on an inner peripheral surface 12*b* side of the intermediate transfer belt 12 and forms an electrode facing the secondary transfer roller 134.

In addition, in the present exemplary embodiment, a power supplying roller 133 made of a metal, which applies a secondary transfer bias to the backup roller 132, is provided.

The secondary transfer unit 13 configured in this manner transfers a toner image transported to the secondary transfer unit 13 by the intermediate transfer belt 12 onto the transported paper P.

The fixer 14 is disposed on a downstream side of the secondary transfer unit 13 in a transport direction of the paper P. The fixer 14 is provided with a fixing belt module 50 that has a heating source and a pressurizing roller 61 provided to face the fixing belt module 50.

In a case where the paper P which has passed through the secondary transfer unit 13 is transported between the fixing belt module 50 and the pressurizing roller 61, an unfixed toner image on the paper P is melted and then fixed onto the paper P. Accordingly, an image consisting of the toner image is formed on the paper P.

Herein, in a general fixing step, a roller is brought into contact with an outer surface of a fixing belt, an attached object on the fixing belt is transferred to the roller, and the attached object attached to the roller is removed by a cleaning web.

However, the fixing belt and the roller respectively have surface roughness, and it is difficult to secure a cleaning property without a toner or wax attached portion attached to the bottom having surface roughness coming into contact with the roller.

Thus, in the present exemplary embodiment, it is possible to secure a cleaning property with respect to a toner or wax attached object attached to the bottom of the fixing belt 51 having roughness, focusing on a rotation speed difference between a circulating and moving fixing belt 51 (see FIG. 2) to be described later and an upstream cleaning roller 71 (see FIG. 2) for removing an attached object remaining on an outer peripheral surface 51*a* of the fixing belt 51 through rotation, which is to be described later.

Hereinafter, various exemplary embodiments of the fixer 14 will be described.

Figure 2:
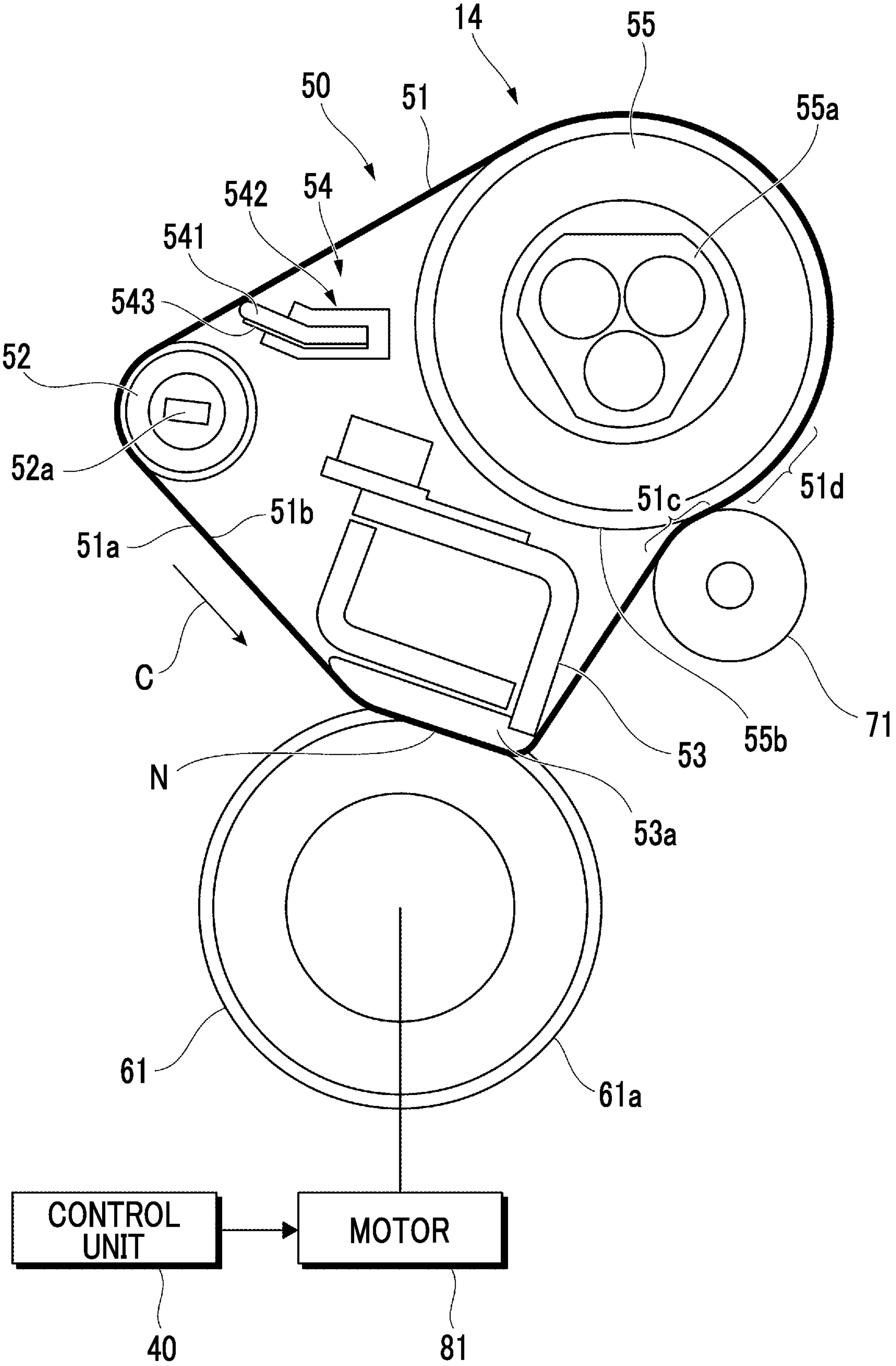
FIG. 2 is a view for describing a configuration of a fixer according to a first exemplary embodiment.

FIG. 2 is a view for describing a configuration of the fixer 14 according to a first exemplary embodiment.

As shown in FIG. 2, the fixer 14 according to the first exemplary embodiment includes the fixing belt module 50 described above that includes the fixing belt 51, which is an example of a fixing member, and the pressurizing roller 61 described above that is in contact with an outer surface of the fixing belt 51.

The fixing belt module 50 includes the fixing belt 51 described above that circulates and moves in an arrow C direction and a first tension roller 52 that stretches the fixing belt 51 from an inside of the fixing belt 51. In addition, the fixing belt module 50 includes a second tension roller 55 that is an example of a rotating member stretching the fixing belt 51 from the inside on an upstream side of the first tension roller 52 in the arrow C direction. Further, the fixing belt module 50 includes a pressing portion 53 that is positioned on the downstream side of the first tension roller 52 in the arrow C direction and has a pad portion 53*a* for forming a nip portion N by pressing the fixing belt 51 against the pressurizing roller 61.

The nip portion N is formed in the fixer 14 as a part of an outer peripheral surface 61*a* of the pressurizing roller 61 is pressed against the outer peripheral surface 51*a* of the fixing belt 51, which is in contact with the pressing portion 53, from the opposite side to the pressing portion 53. The nip portion N where the outer peripheral surface 61*a* of the pressurizing roller 61 and the fixing belt 51 are in contact with each other is a passing portion through which the paper P on which a toner image is formed passes while being pressurized and heated.

The paper P entering the nip portion N has a toner image forming surface on which a toner image is formed, and the paper P enters the nip portion N in a state where the toner image forming surface faces upward in the present exemplary embodiment. Accordingly, a toner image forming surface side of the paper P comes into contact with the fixing belt 51 in the present exemplary embodiment.

In addition, in the present exemplary embodiment, the pressurizing roller 61 is rotationally driven by a motor 81, and the fixing belt 51 circulates and moves, following the pressurizing roller 61. That is, the fixing belt 51 receives a drive force from the rotating pressurizing roller 61 and circulates and moves (circulation movement) in the arrow C direction. The motor 81 is driven and controlled by the control unit 40.

The first tension roller 52 and the second tension roller 55 are rotatably supported and support the fixing belt 51 such that the fixing belt can be circulated and moved as the fixing belt 51 is wound at positions separated from each other. The pressing portion 53 is disposed at a position facing the pressurizing roller 61 with the fixing belt 51 nipped therebetween and presses the fixing belt 51 against the pressurizing roller 61 without rotating. The pressurizing roller 61 includes a layer that can elastically deform to an outer peripheral surface side, and the pressurizing roller 61 is in a shape recessed at the nip portion N as the pressing portion 53 is in contact therewith via the fixing belt 51. In the present exemplary embodiment, the paper P is nipped from both sides by the pressurizing roller 61 and the pressing portion 53, and a pressure is applied to the paper P.

Inside the first tension roller 52, a heater 52*a* is provided. In addition, a heater 55*a* is provided inside the second tension roller 55. The heaters 52*a* and 55*a* are configured by, for example, halogen heaters. The first tension roller 52 is heated by the heat of the heater 52*a*, and the second tension roller 55 is heated by the heat of the heater 55*a*. Then, the fixing belt 51 is heated by the heat from the first tension roller 52 and the second tension roller 55.

In the example shown in FIG. 2, the fixing belt 51 is wound in a section of approximately a quarter of the circumference of an outer peripheral surface of the first tension roller 52, and the fixing belt 51 is wound in a section of approximately a half or more of the circumference of an outer peripheral surface 55*b*, which is an example of an outer peripheral portion of the second tension roller 55. Accordingly, the amount of heat of the heaters 52*a* and 55*a* is applied to the fixing belt 51.

The fixing belt module 50 includes a liquid applying device 54 that applies an oil to an inner surface of the fixing belt 51 between the first tension roller 52 and the second tension roller 55. The liquid applying device 54 includes an oil impregnating member 541 that is in contact with the inner surface of the fixing belt 51, a casing 542 that holds the oil impregnating member, and a support member 543 that supports a part including a tip of the oil impregnating member from an opposite side to the fixing belt 51.

The oil impregnating member 541 is formed by a non-woven fabric formed of heat-resistant fibers being soaked with an oil. For example, polytetrafluoroethylene (PTFE) is used for the heat-resistant fibers. As the oil is applied to an inner peripheral surface 51*b* of the fixing belt 51 by the oil impregnating member 541, the coefficient of friction between the pressing portion 53 and the fixing belt 51 decreases, and the wear of the fixing belt 51 is suppressed.

The fixing belt module 50 includes the upstream cleaning roller 71, which is an example of a removing member, as a configuration for cleaning the outer peripheral surface 51*a* of the fixing belt 51.

Such an upstream cleaning roller 71 is a cleaning member for cleaning the outer peripheral surface 51*a* of the fixing belt 51, and more specifically, removes an attached object attached to the outer peripheral surface 51*a* of the fixing belt 51, which has passed through the nip portion N.

The upstream cleaning roller 71 is provided at a position where the fixing belt 51 is nipped between the second tension roller 55 and the upstream cleaning roller, which is an upstream position of the second tension roller 55. In other words, the upstream cleaning roller 71 is disposed such that a portion of the fixing belt 51, which is separated from the second tension roller 55 at an entrance portion of the second tension roller 55, is pressed against the second tension roller 55.

A surface of the upstream cleaning roller 71 according to the first exemplary embodiment is formed of a non-woven fabric, a felt material, or a porous member. In addition, the upstream cleaning roller 71 according to the first exemplary embodiment is a driven roller that rotates by being in contact with the circulating and moving fixing belt 51.

To describe further, as shown in FIG. 2, the fixing belt 51 which has passed through the nip portion N is deformed in a so-called S-shape by being nipped between the upstream cleaning roller 71 and the second tension roller 55. That is, the fixing belt 51 deforms in a shape in which an inner peripheral surface side convex portion 51*c* that is an example of a second portion, which is a convex portion on an inner peripheral surface 51*b* side of the fixing belt 51 along the upstream cleaning roller 71, and an outer peripheral surface side convex portion 51*d* that is an example of a first portion, which is a convex portion on an outer peripheral surface 51*a* side of the fixing belt 51 along the second tension roller 55, are continuous.

The inner peripheral surface side convex portion 51*c* deforms due to pressing by the upstream cleaning roller 71 at the entrance portion with respect to the second tension roller 55 of the fixing belt 51.

Such a deformation in an S-shape forms a trajectory of the fixing belt 51 due to the pressing the upstream cleaning roller 71 at the entrance portion with respect to the second tension roller 55 of the fixing belt 51.

Herein, a strain in a case where the fixing belt 51 comes into contact with the second tension roller 55 and the upstream cleaning roller 71, which are adjacent to each other, to form an S-shape (hereinafter, referred to as S-shape contact) and a strain in a case where the fixing belt 51 is not in contact with the upstream cleaning roller 71 while being in contact with the only second tension roller 55 (hereinafter, referred to as simple contact) are compared to each other.

Figure 3:
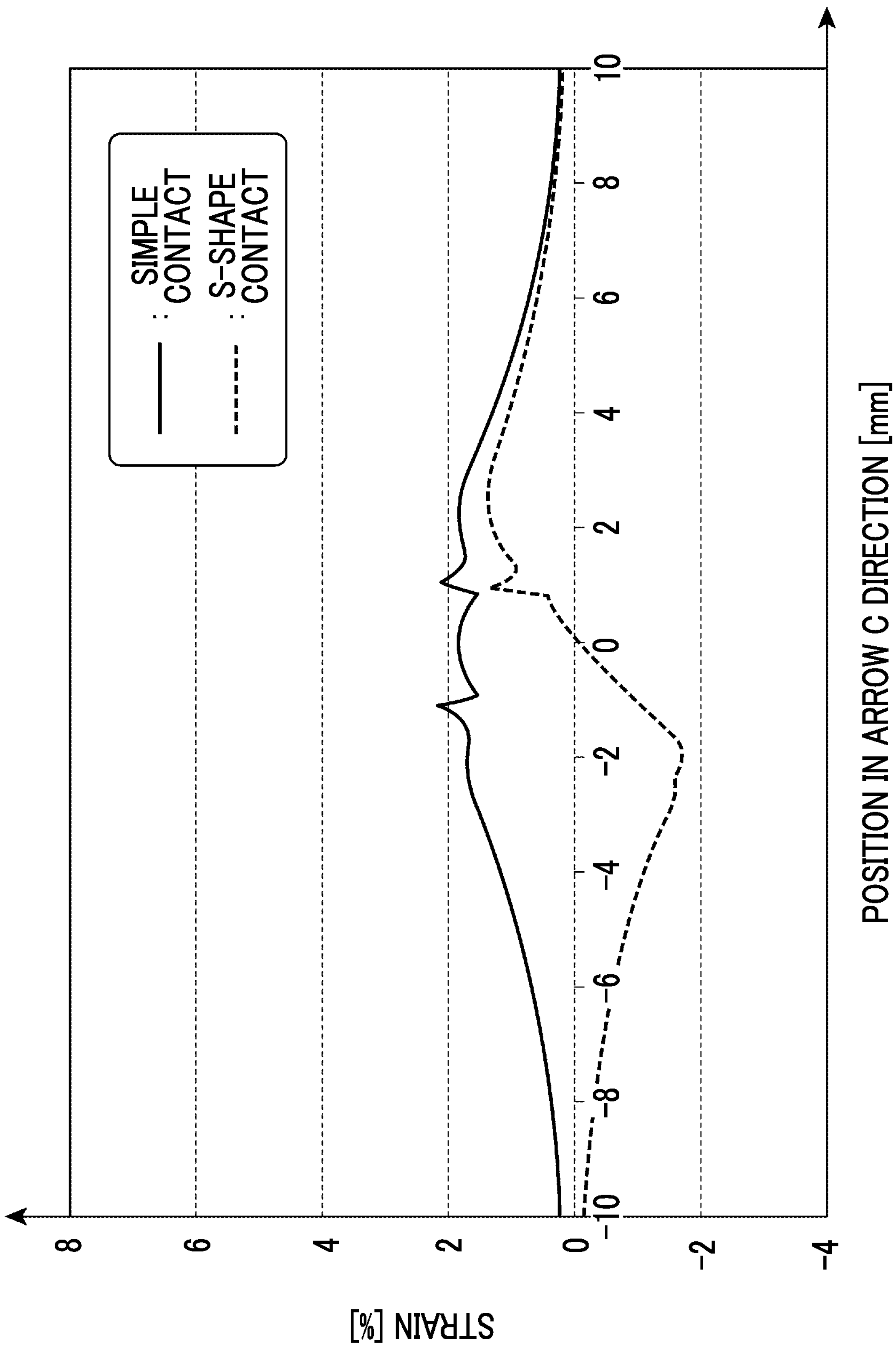
FIG. 3 is a graph showing strains in a circumferential direction in simple contact and S-shape contact, a vertical axis shows a strain (%) of a fixing belt, and a horizontal axis shows a position (mm) in an arrow C direction.

FIG. 3 is a graph showing strains in a circumferential direction in the simple contact and the S-shape contact. The vertical axis shows the strain (%) of the fixing belt 51, and the horizontal axis shows a position (mm) in the arrow C direction. In FIG. 3, the simple contact is shown by a solid line, and the S-shape contact is shown by a broken line. In addition, herein, the arrow C direction is shown in FIG. 2. The strain shows extension (contraction) as a percentage.

As shown in FIG. 3, the simple contact shown by the solid line is a case where the fixing belt 51 is wound around the second tension roller 55 (see FIG. 2), but the upstream cleaning roller 71 is not included. The case of the simple contact is a graph that is symmetrical with respect to position 0 mm, and there is no difference in strain between a case where a distance is from position 0 mm to the left (upstream side) and a case where a distance is from position 0 mm to the right (downstream side).

To describe further, the strain of the fixing belt 51 is high at the entrance portion of the second tension roller 55 (see FIG. 2). In the S-shape contact shown by the broken line, an S-shaped trajectory is formed by disposing the upstream cleaning roller 71 at such an entrance portion.

That is, in the S-shape contact shown by the broken line, the upstream cleaning roller 71 is disposed on the upstream side (see FIG. 2). According to the graph, it can be read that the fixing belt 51 contracts on the left from position 0 mm and extends on the right from position 0 mm since the sign of the strain is negative on the left from position 0 mm, and the sign of the strain is positive on the right from position 0 mm.

On the left from position 0 mm, the fixing belt 51 contracts by the action of the upstream cleaning roller 71. On the right from position 0 mm where the action of the upstream cleaning roller 71 is not received, the strain is positive and becomes similar to the case of the simple contact (solid line).

To describe further, at the entrance of the second tension roller 55 (see FIG. 2) at a position on the left from position 0 mm, there is a portion where the negative value of the strain increases, and after then, the negative value of the strain decreases and becomes a positive value. Because of such strain fluctuations of the fixing belt 51, a rotation speed difference between the fixing belt 51 and the upstream cleaning roller 71 occurs.

Figure 4:
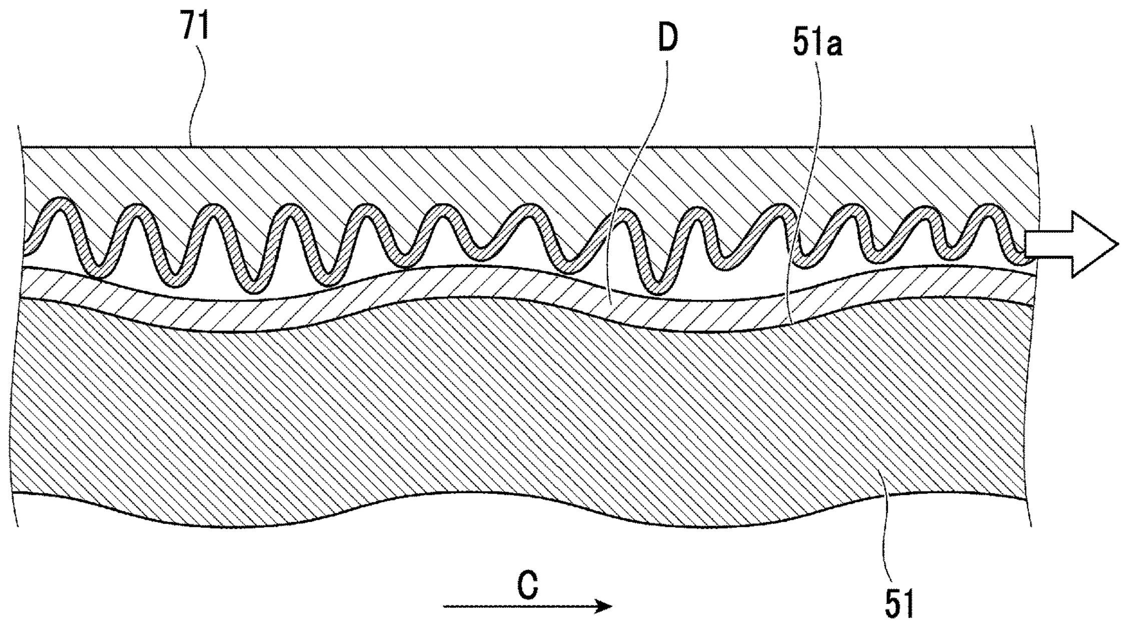
FIG. 4 is a view for describing a relative movement between an upstream cleaning roller and the fixing belt.

FIG. 4 is a view for describing relative movement between the upstream cleaning roller 71, which is an example of the removing member, and the fixing belt 51, which is an example of the fixing member.

As shown in FIG. 4, there is an attached object D on the outer peripheral surface 51*a* of the fixing belt 51. Such an attached object D is removed by the upstream cleaning roller 71 having a speed different from the speed of the fixing belt 51. That is, the upstream cleaning roller 71 removes the attached object D attached to the outer peripheral surface 51*a* of the fixing belt 51 using the rotation speed difference with respect to the fixing belt 51.

As described above, the surface of the upstream cleaning roller 71 is formed of a non-woven fabric or a felt material. For this reason, a toner or wax in a liquid state, which is the attached object D, can be removed by the upstream cleaning roller 71, and the generation of an offset image, which is generated as the attached object D is again transferred to the paper P transported next, is suppressed.

Figure 5:
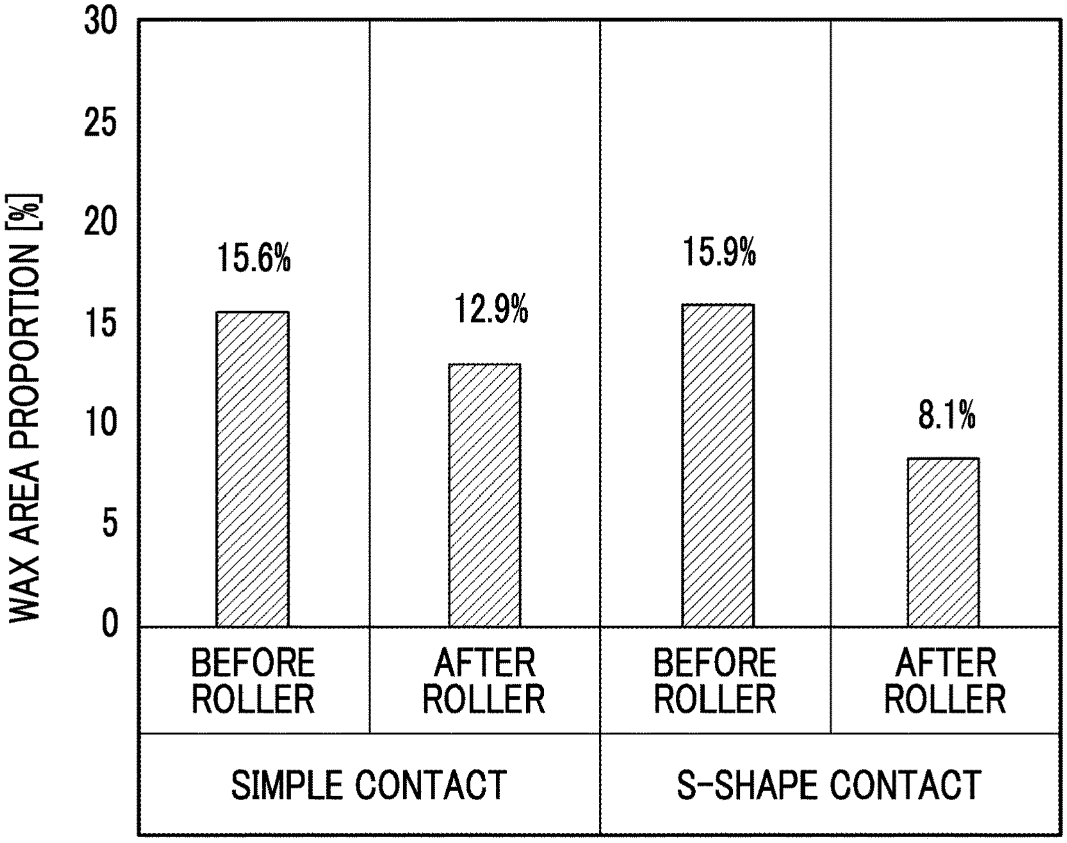
FIG. 5 is a graph showing a wax amount of the fixing belt before and after cleaning by the upstream cleaning roller in the simple contact and the S-shape contact, a vertical axis represents a wax area proportion (%), and a horizontal axis represents each of the simple contact and the S-shape contact separately before (before the roller) and after (after the roller) an upstream cleaning roller 71.

FIG. 5 is a graph showing a wax amount of the fixing belt 51 before and after cleaning by the upstream cleaning roller 71 in the simple contact and the S-shape contact. The vertical axis represents a wax area proportion (%), and the horizontal axis represents each of the simple contact and the S-shape contact separately before (before the roller) and after (after the roller) the upstream cleaning roller 71.

As is clear from the graph shown in FIG. 5, in a case of the simple contact, the wax area proportion is 15.6% before the roller and is 12.9% after the roller, which means cleaned by the upstream cleaning roller 71. On the other hand, in a case of the S-shape contact, the wax area proportion is 15.9% before the roller and greatly decreases to 8.1% after the roller, which means cleaned by the upstream cleaning roller 71.

As described above, a cleaning property is improved in the case of the S-shape contact, compared to the case of the simple contact. The wax area proportion herein is a wax amount attached to the outer peripheral surface 51*a* of the fixing belt 51 per unit area, which is shown in an area proportion. In addition, the fact that the simple contact before cleaning is 15.6% and the S-shape contact before cleaning is 15.9%, which are values not identical to each other, is attributable to a measurement error.

Figure 6:
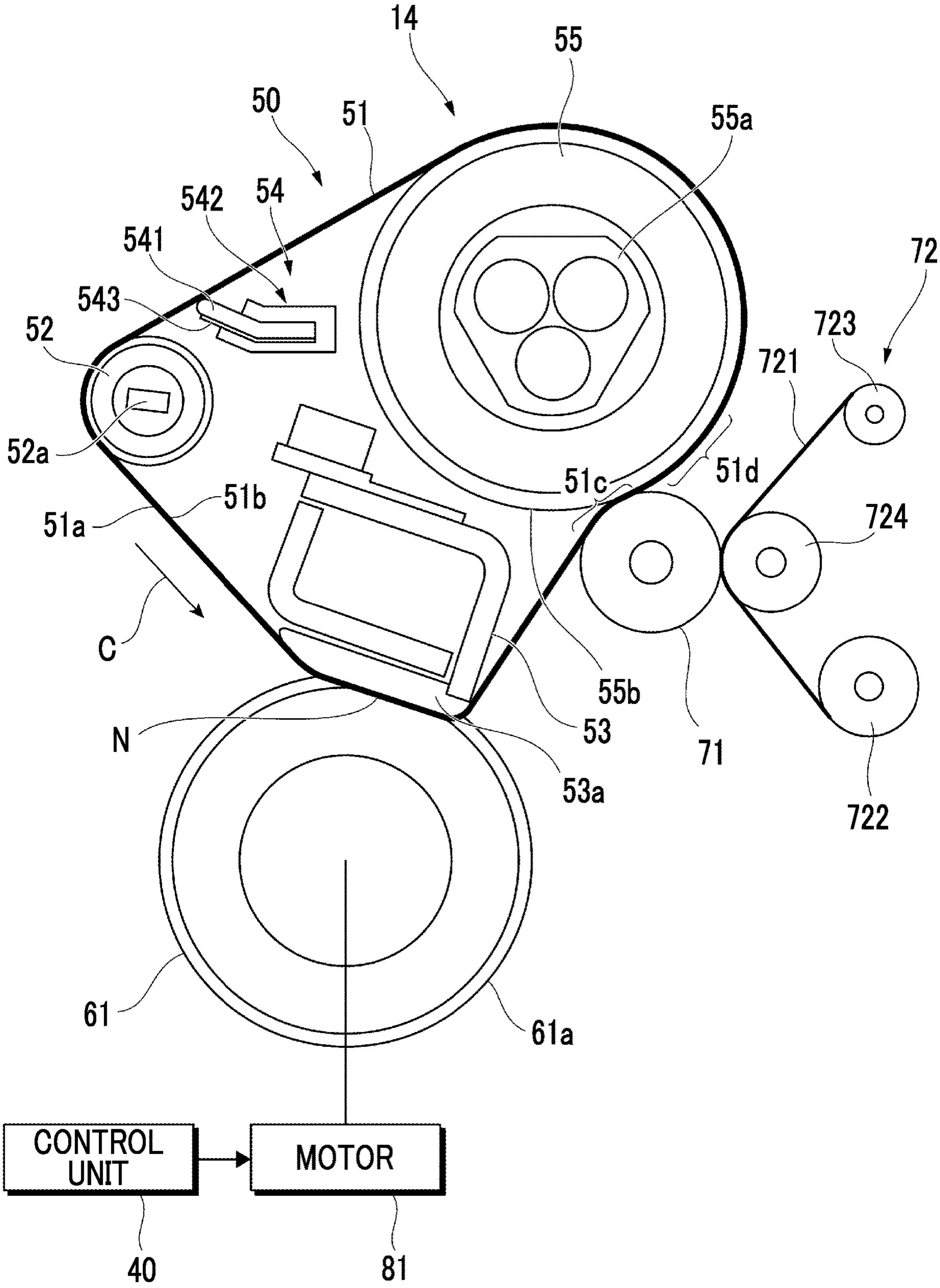
FIG. 6 is a view for describing a configuration of a fixer according to a second exemplary embodiment.

FIG. 6 is a view for describing a configuration of the fixer 14 according to a second exemplary embodiment. Since the second exemplary embodiment has a portion common to the configuration of the first exemplary embodiment described above, the same reference sign will be used for the common portion, and description thereof will be omitted in some cases.

In the second exemplary embodiment shown in FIG. 6, a cleaning mechanism 72 is included as a configuration for cleaning the outer peripheral surface 51*a* of the fixing belt 51, in addition to including the upstream cleaning roller 71.

The cleaning mechanism 72 includes a holding portion 722 that holds and sends out an unused cleaning web 721 in a wound form and a supply portion 723 around which the cleaning web 721 is wound and that supplies the cleaning web 721 from the holding portion 722 to an outer peripheral surface of the upstream cleaning roller 71. In addition, the cleaning mechanism 72 includes a pressing member 724 that presses the cleaning web 721 against a surface of the upstream cleaning roller 71.

The upstream cleaning roller 71 according to the second exemplary embodiment is a metal roller, and an attached object on the upstream cleaning roller 71 which is removed from the fixing belt 51 is removed from the upstream cleaning roller 71 by the cleaning web 721. The cleaning web 721 cleans the upstream cleaning roller 71 which is a metal roller.

In addition, the upstream cleaning roller 71 according to the second exemplary embodiment is a driven roller as in the first exemplary embodiment.

Figure 7:
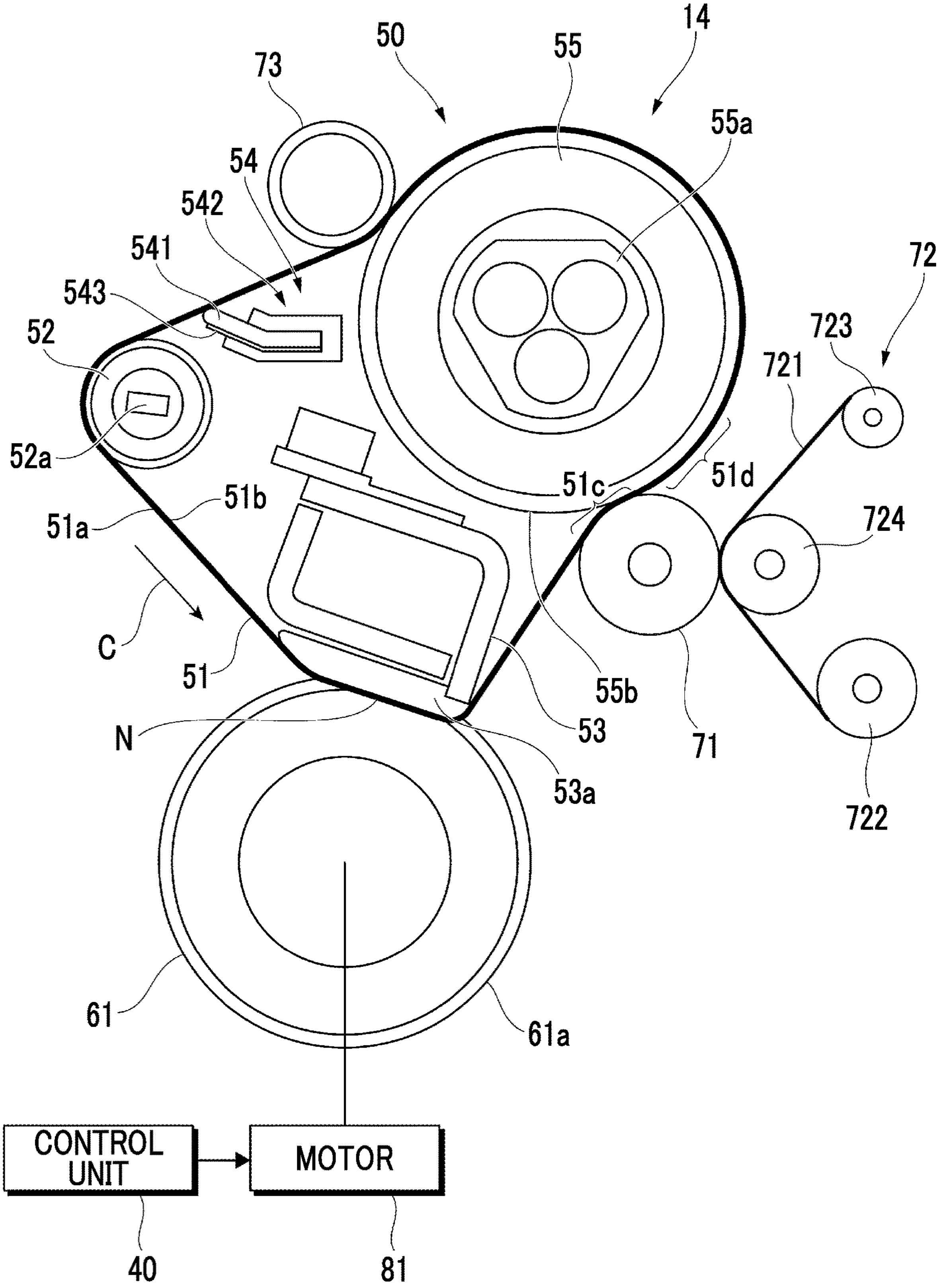
FIG. 7 is a view for describing a configuration of a fixer according to a third exemplary embodiment.

FIG. 7 is a view for describing a configuration of the fixer 14 according to a third exemplary embodiment. Since the third exemplary embodiment has a portion common to the configuration of the second exemplary embodiment described above, the same reference sign will be used for the common portion, and description thereof will be omitted in some cases.

In the third exemplary embodiment shown in FIG. 7, a downstream cleaning roller 73 which is an example of another removing member is included at an exit portion with respect to the second tension roller 55 of the fixing belt 51 as a configuration for cleaning the outer peripheral surface 51*a* of the fixing belt 51, in addition to including the upstream cleaning roller 71 and the cleaning mechanism 72 which are examples of the removing member.

The downstream cleaning roller 73 is disposed at a downstream position of the second tension roller 55 and removes an attached object which has not been able to be removed by the upstream cleaning roller 71.

To describe further, the downstream cleaning roller 73 is disposed such that a portion of the fixing belt 51, which is separated from the second tension roller 55 at the exit portion of the second tension roller 55, is pressed against the second tension roller 55. With such disposition, the S-shape contact at the entrance portion of the second tension roller 55, which is described for the upstream cleaning roller 71, is formed also at the exit portion of the second tension roller 55 by the downstream cleaning roller 73. Accordingly, the cleaning property of the downstream cleaning roller 73 improves.

The inner peripheral surface side convex portion 51*c* in the S-shape contact at the exit portion of the second tension roller 55 is a deformation due to pressing by the downstream cleaning roller 73.

In the third exemplary embodiment, the upstream cleaning roller 71 at the entrance portion is a metal roller as in the case of the second exemplary embodiment, and a surface of the downstream cleaning roller 73 added to the exit portion is a removing surface formed of a non-woven fabric, a felt material, or a porous member. That is, the upstream cleaning roller 71 made of a metal generally removes powdered toner, and the non-woven fabric surface having the downstream cleaning roller 73 removes residual liquid wax. In the third exemplary embodiment, the upstream cleaning roller is useful in a case of color printing in which a large amount of toner is used. In addition, since the exit portion of the fixing belt 51 with respect to the second tension roller 55 is higher than the entrance portion, residual wax is efficiently removed.

The upstream cleaning roller 71 and the downstream cleaning roller 73 according to the third exemplary embodiment are driven rollers.

Figure 8:
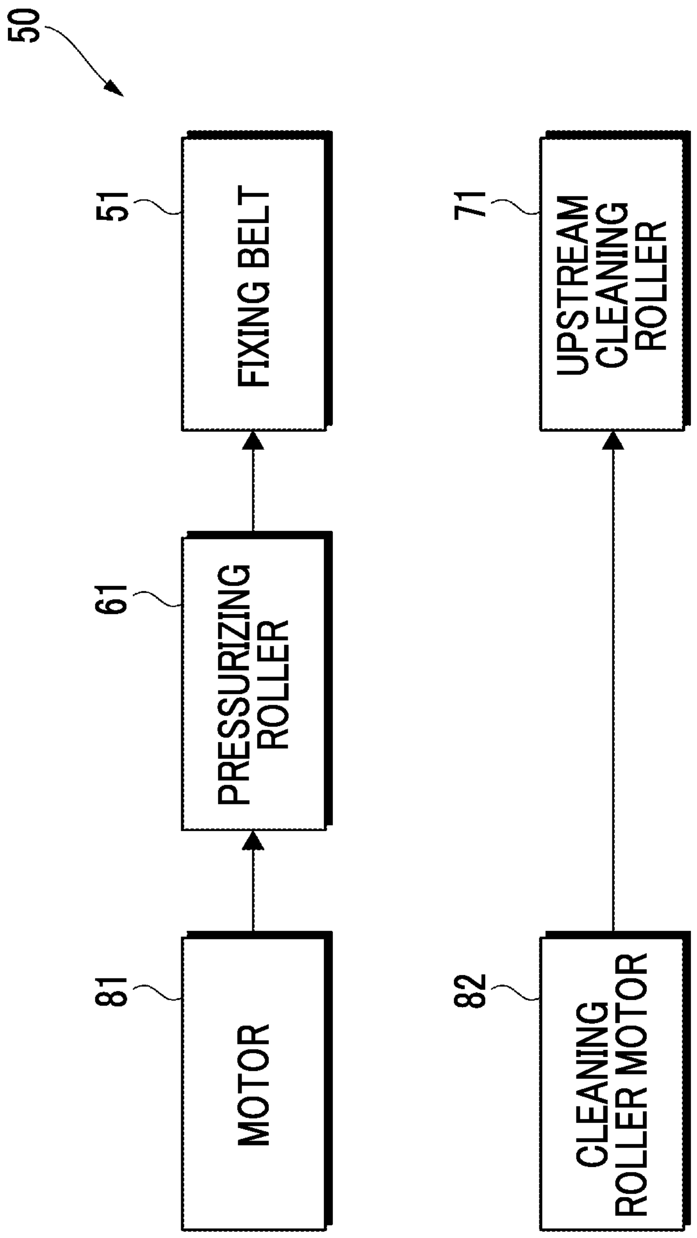
FIG. 8 is a block diagram for describing a fourth exemplary embodiment.
Figure 9A:
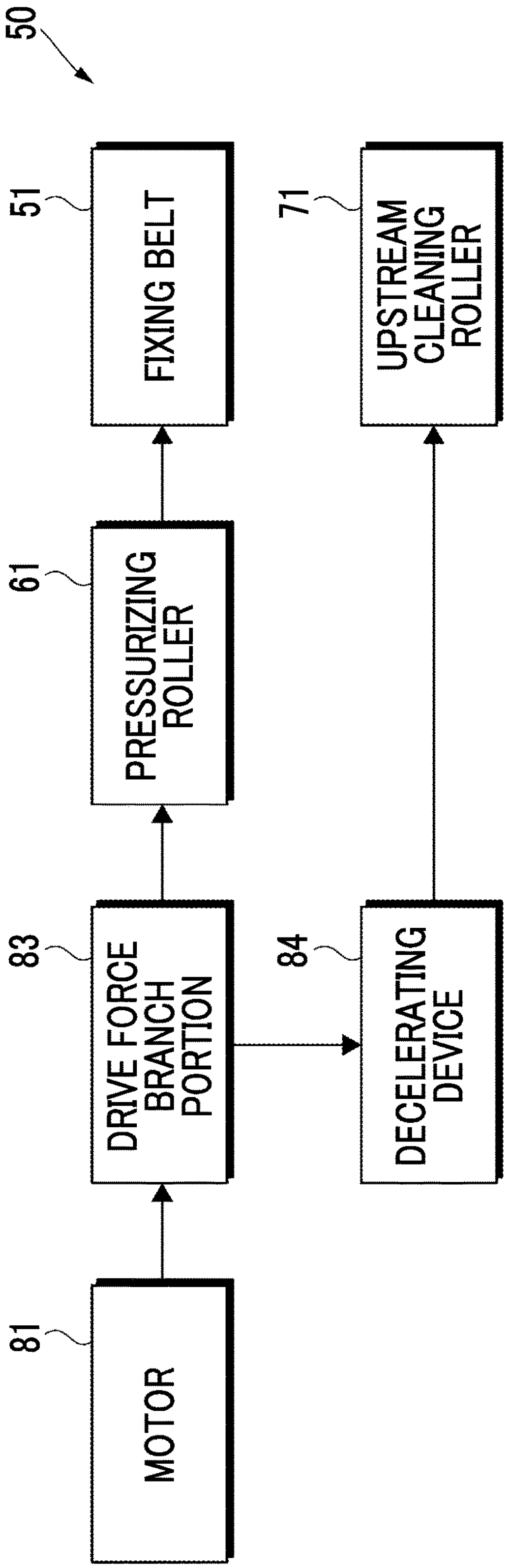
FIGS. 9A and 9B are block diagrams for describing other exemplary embodiments.
Figure 9B:
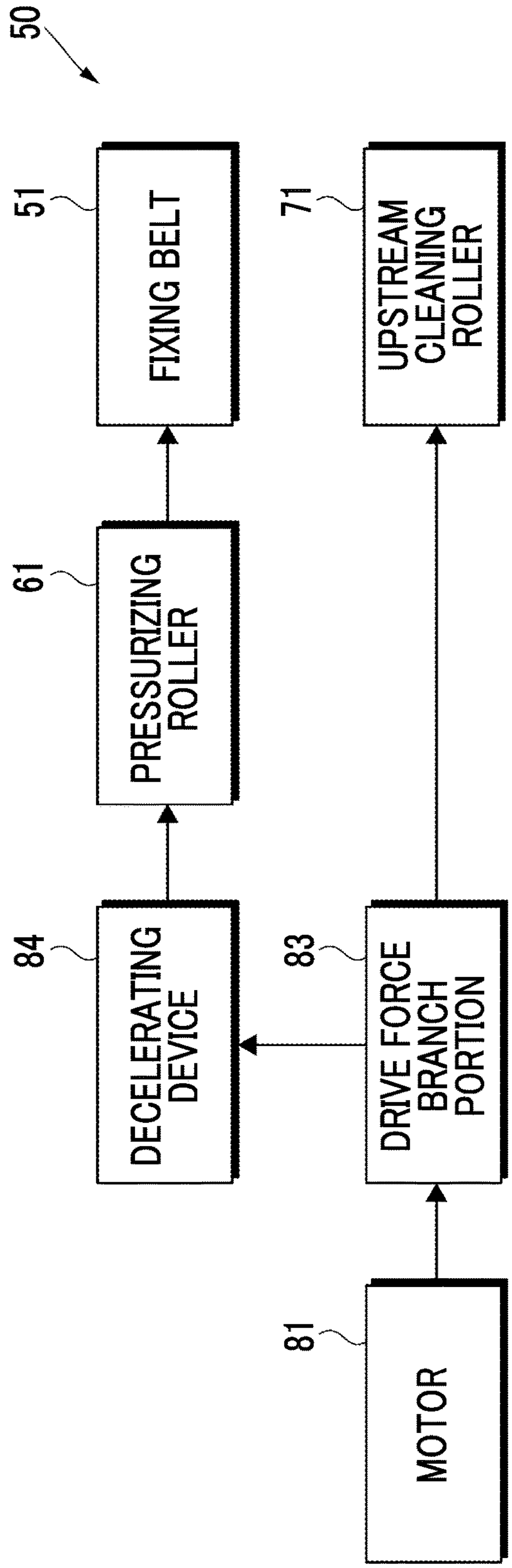

FIG. 8 is a block diagram for describing a fourth exemplary embodiment. FIGS. 9A and 9B are block diagrams for describing other exemplary embodiments. FIG. 9A is a block diagram for describing a fifth exemplary embodiment, and FIG. 9B is a block diagram for describing a sixth exemplary embodiment. In the exemplary embodiments, a rotation speed difference between the fixing belt 51 and the upstream cleaning roller 71 is realized by a configuration of a drive source or a drive transmission system.

Hereinafter, description will be made.

In the fourth exemplary embodiment shown in FIG. 8, the fixing belt module 50 includes a cleaning roller motor 82 which is an example of another drive source, in addition to including the motor 81 described above which is an example of a drive source driving the fixing member. That is, as shown in FIG. 8, the fixing belt module 50 includes two motors including the motor 81 described above that rotationally drives the pressurizing roller 61 and the cleaning roller motor 82 that rotationally drives the upstream cleaning roller 71. Such a motor 81 and such a cleaning roller motor 82 are driven and controlled by the control unit 40.

In the fixing belt module 50 according to the fourth exemplary embodiment, the control unit 40 controls the motor 81 and the cleaning roller motor 82 such that a rotation speed difference between the fixing belt 51 and the upstream cleaning roller 71 occurs.

In the fifth exemplary embodiment shown in FIG. 9A, the fixing belt module 50 includes the motor 81 described above, a drive force branch portion 83 where a drive force of the motor 81 branches, and a decelerating device 84 that reduces the speed of one drive force branched at the drive force branch portion 83.

Then, the drive force of which the speed is reduced by the decelerating device 84 is transmitted to the upstream cleaning roller 71. In addition, the other drive force branched at the drive force branch portion 83 is transmitted to the fixing belt 51 via the pressurizing roller 61.

In the fixing belt module 50 according to the fifth exemplary embodiment, the upstream cleaning roller 71 is driven by the drive force which branches at a transmission system from the motor 81 described above and of which the speed is reduced, and the pressurizing roller 61 and the fixing belt 51 are driven by a drive force of which a speed is not reduced. Accordingly, the rotation speed of the upstream cleaning roller 71 becomes lower than the rotation speed of the fixing belt 51, and a rotation speed difference between both is realized.

As described above, a rotation speed difference between the fixing belt 51 and the upstream cleaning roller 71 occurs due to a configuration of transmitting the drive force of one motor 81.

In the sixth exemplary embodiment shown in FIG. 9B, the motor 81, the drive force branch portion 83, and the decelerating device 84 are included as in the case of the fifth exemplary embodiment. On the other hand, the sixth exemplary embodiment is different from the case of the fifth exemplary embodiment in that the pressurizing roller 61 and the fixing belt 51 are driven by the drive force of which the speed is reduced, and the upstream cleaning roller 71 is driven by the drive force of which the speed is not reduced. Accordingly, the rotation speed of the fixing belt 51 becomes lower than the rotation speed of the upstream cleaning roller 71, and a rotation speed difference between both is realized.

As described above, also in the sixth exemplary embodiment, a rotation speed difference between the fixing belt 51 and the upstream cleaning roller 71 occurs due to the configuration of transmitting the drive force of one motor 81.

The fourth exemplary embodiment, the fifth exemplary embodiment, and the sixth exemplary embodiment described above may be applied to the case of the S-shape contact (see FIG. 2, 6, or 7) described above and may be applied to a case of the simple contact by disposing the upstream cleaning roller 71 at a relative position with respect to the second tension roller 55 such that the S-shape contact is not caused.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A fixing device comprising:

a fixing member that has an outer peripheral surface and an inner peripheral surface, is rotatably provided, comes into contact with a surface of a recording material on which an image is formed, and fixes the image to the recording material;

a rotating member that is rotatably provided and includes, at an outer peripheral portion, a contact surface coming into contact with the inner peripheral surface of the fixing member; and a first removing member that is disposed to be in contact with the outer peripheral surface of the fixing member, is rotatably provided, and removes an attached object attached to the outer peripheral surface using a rotation speed difference with respect to the fixing member, wherein a portion of the fixing member is deformed in an S-shape by being nipped between the first removing member and the rotating member, and the first removing member is disposed such that the portion of the fixing member is pressed against the rotating member, wherein the rotation speed difference between the first removing member and the fixing member is caused by deformation of the fixing member into a shape in which a first portion that is a convex portion on an outer peripheral surface side of the fixing member and a second portion that is a convex portion on an inner peripheral surface side of the fixing member are continuous, wherein the second portion is a deformation due to pressing by the first removing member at an entrance portion of the fixing member with respect to the rotating member, and wherein a second removing member different from the first removing member is disposed at an exit portion of the fixing member with respect to the rotating member, and a portion of the fixing member is deformed in the S-shape by being nipped between the second removing member and the rotating member, and the second removing member is disposed such that the portion of the fixing member is pressed against the rotating member.

2. The fixing device according to claim 1, wherein the rotation speed difference between the first removing member and the fixing member is further caused by driving the first removing member such that a rotation speed is different with respect to the fixing member.

3. The fixing device according to claim 2, wherein the driving is performed by a drive source different from a drive source driving the fixing member.

4. The fixing device according to claim 2, wherein the driving is performed by a drive force that branches at a transmission system from a drive source driving the fixing member and of which a speed is reduced.

5. The fixing device according to claim 1, wherein the first removing member at the entrance portion is a metal roller, and a removing surface of the different second removing member at the exit portion is a non-woven fabric or felt.

6. The fixing device according to claim 1, wherein the convex portion on the inner peripheral surface side of the fixing member at the exit portion of the fixing member with respect to the rotating member is a deformation due to pressing by the second removing member.

7. An image forming apparatus comprising:

an image forming portion that forms an image on a recording material;

a fixing member that has an outer peripheral surface and an inner peripheral surface, is rotatably provided, comes into contact with a surface of the recording material on which the image is formed, and fixes the image to the recording material;

a rotating member that is rotatably provided and includes, at an outer peripheral portion, a contact surface coming into contact with the inner peripheral surface of the fixing member; and a first removing member that is disposed to be in contact with the outer peripheral surface of the fixing member, is rotatably provided, and removes an attached object attached to the outer peripheral surface using a rotation speed difference with respect to the fixing member, wherein a portion of the fixing member is deformed in an S-shape by being nipped between the first removing member and the rotating member, and the first removing member is disposed such that the portion of the fixing member is pressed against the rotating member, wherein the rotation speed difference between the first removing member and the fixing member is caused by deformation of the fixing member into a shape in which a first portion that is a convex portion on an outer peripheral surface side of the fixing member and a second portion that is a convex portion on an inner peripheral surface side of the fixing member are continuous, wherein the second portion is a deformation due to pressing by the first removing member at an entrance portion of the fixing member with respect to the rotating member, and wherein a second removing member different from the first removing member is disposed at an exit portion of the fixing member with respect to the rotating member, and a portion of the fixing member is deformed in the S-shape by being nipped between the second removing member and the rotating member, and the second removing member is disposed such that the portion of the fixing member is pressed against the rotating member.

* * * * *